United States Patent
Webb

(10) Patent No.: US 7,167,522 B2
(45) Date of Patent: Jan. 23, 2007

(54) VIDEO DEBLOCKING FILTER

(75) Inventor: Jennifer Webb, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 882 days.

(21) Appl. No.: 10/375,544

(22) Filed: Feb. 27, 2003

(65) Prior Publication Data
US 2004/0184549 A1    Sep. 23, 2004

(51) Int. Cl.
*H04N 7/12*    (2006.01)

(52) U.S. Cl. .................................. 375/240.29

(58) Field of Classification Search ................ 348/402, 348/416, 413, 700, 719, 699; 375/240.17, 375/240.27, 240.29, 240.01; 382/239, 236, 382/238, 261, 268, 275; 386/95, 125
See application file for complete search history.

(56) References Cited

U.S. PATENT DOCUMENTS

| 7,003,174 B1* | 2/2006 | Kryukov et al. ............ 382/266 |
| 2003/0053708 A1* | 3/2003 | Kryukov et al. ............ 382/261 |

* cited by examiner

*Primary Examiner*—Tung Vo
*Assistant Examiner*—Behrooz Senfi
(74) *Attorney, Agent, or Firm*—Carlton H. Hoel; W. James Brady; Frederick J. Telecky, Jr.

(57) ABSTRACT

Decomposition of deblocking filters used in block-based video compression allows reduction of computational redundancies.

4 Claims, 4 Drawing Sheets

FIG. 5

| p3 | p2 | p1 | p0 | q0 | q1 | q2 | q3 |
|----|----|----|----|----|----|----|----|

FIG. 6A

INDEX$_A$ (FOR α) OR INDEX$_B$ (FOR β)

|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|----|----|----|----|----|----|----|----|----|----|----|----|----|----|----|----|
| α | 0 | 0 | 0 | 0 | 0 | 0 | 0 | 0 | 0 | 0 | 0  | 0  | 0  | 0  | 0  | 0  | 4  | 4  | 5  | 6  | 7  | 8  | 9  | 10 | 12 | 13 |
| β | 0 | 0 | 0 | 0 | 0 | 0 | 0 | 0 | 0 | 0 | 0  | 0  | 0  | 0  | 0  | 0  | 2  | 2  | 2  | 3  | 3  | 3  | 3  | 4  | 4  | 4  |

INDEX$_A$ (FOR α) OR INDEX$_B$ (FOR β)

|   | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|----|----|----|----|----|----|----|----|----|----|----|----|----|----|----|----|----|----|----|----|----|----|----|----|----|----|
| α | 15 | 17 | 20 | 22 | 25 | 28 | 32 | 36 | 40 | 45 | 50 | 56 | 63 | 71 | 80 | 90 | 101 | 113 | 127 | 144 | 162 | 182 | 203 | 226 | 255 | 255 |
| β | 6  | 6  | 7  | 7  | 8  | 8  | 9  | 9  | 10 | 10 | 11 | 11 | 12 | 12 | 13 | 13 | 14  | 14  | 15  | 15  | 16  | 16  | 17  | 17  | 18  | 18  |

FIG. 6B

| INDEX$_A$ | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| BS=1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| BS=2 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 |
| BS=3 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 |

| INDEX$_A$ | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| BS=1 | 1 | 1 | 1 | 1 | 1 | 1 | 1 | 2 | 2 | 2 | 2 | 3 | 3 | 3 | 4 | 4 | 4 | 5 | 6 | 6 | 7 | 8 | 9 | 10 | 11 | 13 |
| BS=2 | 1 | 1 | 1 | 1 | 1 | 2 | 2 | 2 | 2 | 3 | 3 | 3 | 4 | 4 | 5 | 5 | 6 | 7 | 8 | 8 | 10 | 11 | 12 | 13 | 15 | 17 |
| BS=3 | 1 | 2 | 2 | 2 | 2 | 3 | 3 | 3 | 4 | 4 | 4 | 5 | 6 | 6 | 7 | 8 | 9 | 10 | 11 | 13 | 14 | 16 | 18 | 20 | 23 | 25 |

VIDEO DEBLOCKING FILTER

BACKGROUND OF THE INVENTION

The present invention relates to video compression and decompression, and more particularly to filtering in block-based methods.

Digital video compression allows for practical (reduced bandwidth) realtime transmission of video without significant loss of quality. Many video compression standards have been developed beginning in the 1980s and include H.261, H.263, MPEG-1, MPEG-2, MPEG-4, and so forth. These standards generally use a block-based compression which includes motion compensation, block transform (e.g., DCT or wavelet) coding, and quantization. FIG. 2 illustrates a system with motion estimation (ME), motion compensation (MC), DCT, quantization (Q), inverse DCT (IDCT), and variable length coding (VLC) of the transmitted motion vectors and quantized DCT-transformed motion compensation residual.

H.264 is a new video compression video standard being developed by ITU-T. It offers much higher coding efficiency which provides about 30–50% additional bit-rate reduction at the same coding qualities as compared to the MPEG-4 SP. A typical application of H.264 could be wireless video on demand, in which the bandwidth is so limited that a coding standard of high compression ratio is strongly desired.

The basic coding techniques in H.264 are still the motion compensated prediction, transform, quantization and entropy coding. However, it differs from MPEG-4/H.263 in great detail. One of major differences lies in the transform and quantization. Instead of 8×8 DCT transforms, H.264 uses a 4×4 integer transforms for the residual coding (residual blocks are generated by using the motion compensation for inter-coded macroblocks, and using the intra prediction for intra-coded macroblocks).

As with all block-based compression methods, H.264 suffers from blockiness in the decompressed (reconstructed) video images. FIG. 3 illustrates the edges of blocks (4×4 blocks within 16×16 macroblocks) subject to deblocking filtering.

SUMMARY OF THE INVENTION

The present invention provides decomposition of a deblocking filter as used in H.264 and which reduces computational redundancy.

BRIEF DESCRIPTION OF THE DRAWINGS

The drawings are heuristic for clarity.

FIG. 5 shows pixel notation.

FIGS. 6a–6b are parameter tables.

DESCRIPTION OF THE PREFERRED EMBODIMENTS

1. Overview

Figure 1:
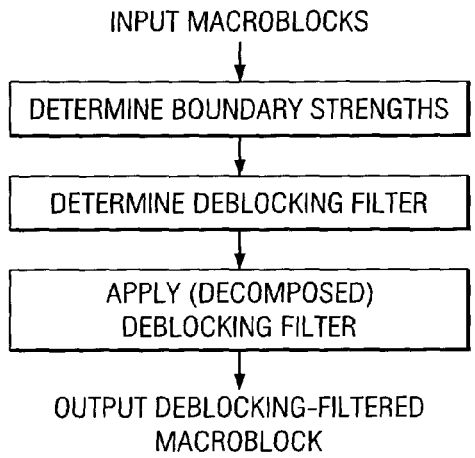
FIG. 1 is a flow diagram of preferred embodiment methods.
Figure 2:
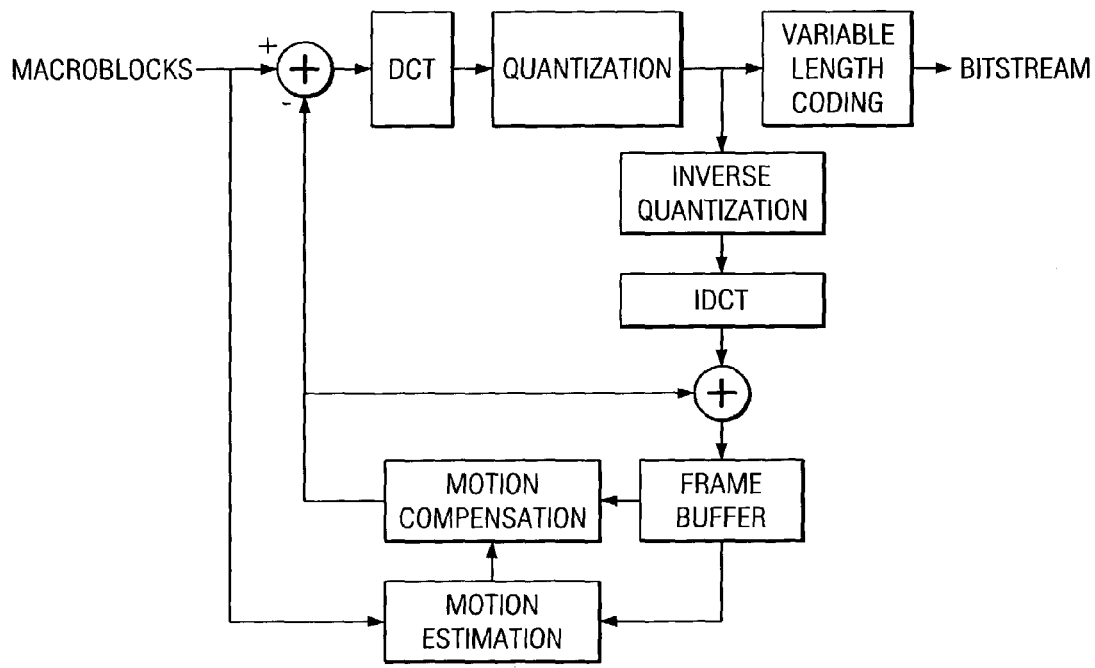
FIG. 2 shows motion compensation generally.

Preferred embodiment methods provide simplified deblocking filtering (as in H.264) by decomposition of the deblocking filter. This effectively creates intermediate values from pixel values being filtered and thereby reduces the redundancy in the deblocking filtering. FIG. 1 illustrates the overall flow.

Preferred embodiment communication systems, such as cellular spread spectrum systems, include preferred embodiment devices employing preferred embodiment deblocking filtering methods. The computations can be performed with digital signal processors (DSPs) or general-purpose programmable processors or application specific circuitry (ASICs) or systems on a chip such as both a DSP, ASIC, and RISC processor on the same chip with the RISC processor controlling. Analog-to-digital converters and digital-to-analog converters provide coupling to the real world, and modulators and demodulators (plus antennas for air interfaces) provide coupling for transmission waveforms.

2. First Preferred Embodiments

Initially, consider the following description of the deblocking filtering of H.264; the preferred embodiments will be implementations of the deblocking filtering.

Figure 3:
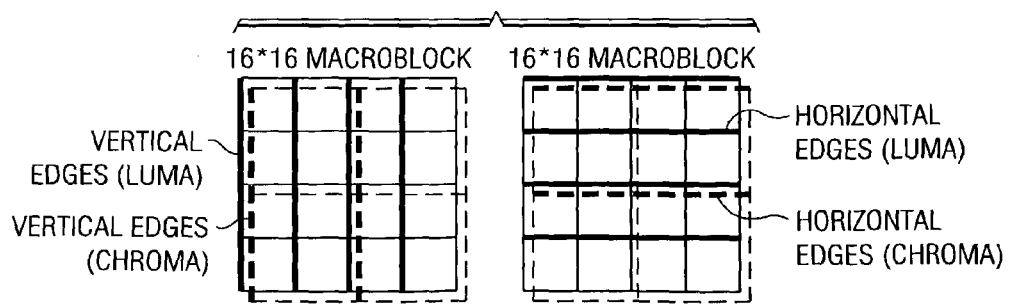
FIG. 3 illustrates edges for deblocking filtering.

H.264 requires a conditional filtering be applied to all macroblocks of a picture. This filtering is done on a macroblock basis, with macroblocks being processed in raster-scan order throughout the picture. For luma, as the first step, the 16 samples of the 4 vertical edges of the 4×4 raster shall be filtered beginning with the left edge, as shown in FIG. 3. Filtering of the 4 horizontal edges (vertical filtering) follows in the same manner, beginning with the top edge. The same ordering applies for chroma filtering, with the exception that 2 edges of 8 samples each are filtered in each direction. This process also affects the boundaries of the already reconstructed macroblocks above and to the left of the current macroblock. Picture edges are not filtered.

When mb_adaptive_frame_field_flag=1, a MB may be coded in frame or field decoding mode. For frame MB, deblocking is performed on the frame samples. In this case, if neighboring MB pairs are field MBs, they shall be converted into frame MB pairs before deblocking. For field MB, deblocking is performed on the field samples of the same field parity. In this case, if neighboring MB pairs are frame MBs, they shall be converted into field MB pairs before deblocking.

Intra prediction of a macroblock shall be done using the unfiltered content of the already decoded neighboring macroblocks. Depending on the implementation, the values necessary for intra prediction may need to be stored before filtering in order to be used in the intra prediction of the macroblocks to the right and below the current macroblock.

When pic_structure indicates a field picture all decoding operations for the deblocking filter are based solely on samples within the current field.

Figure 4:
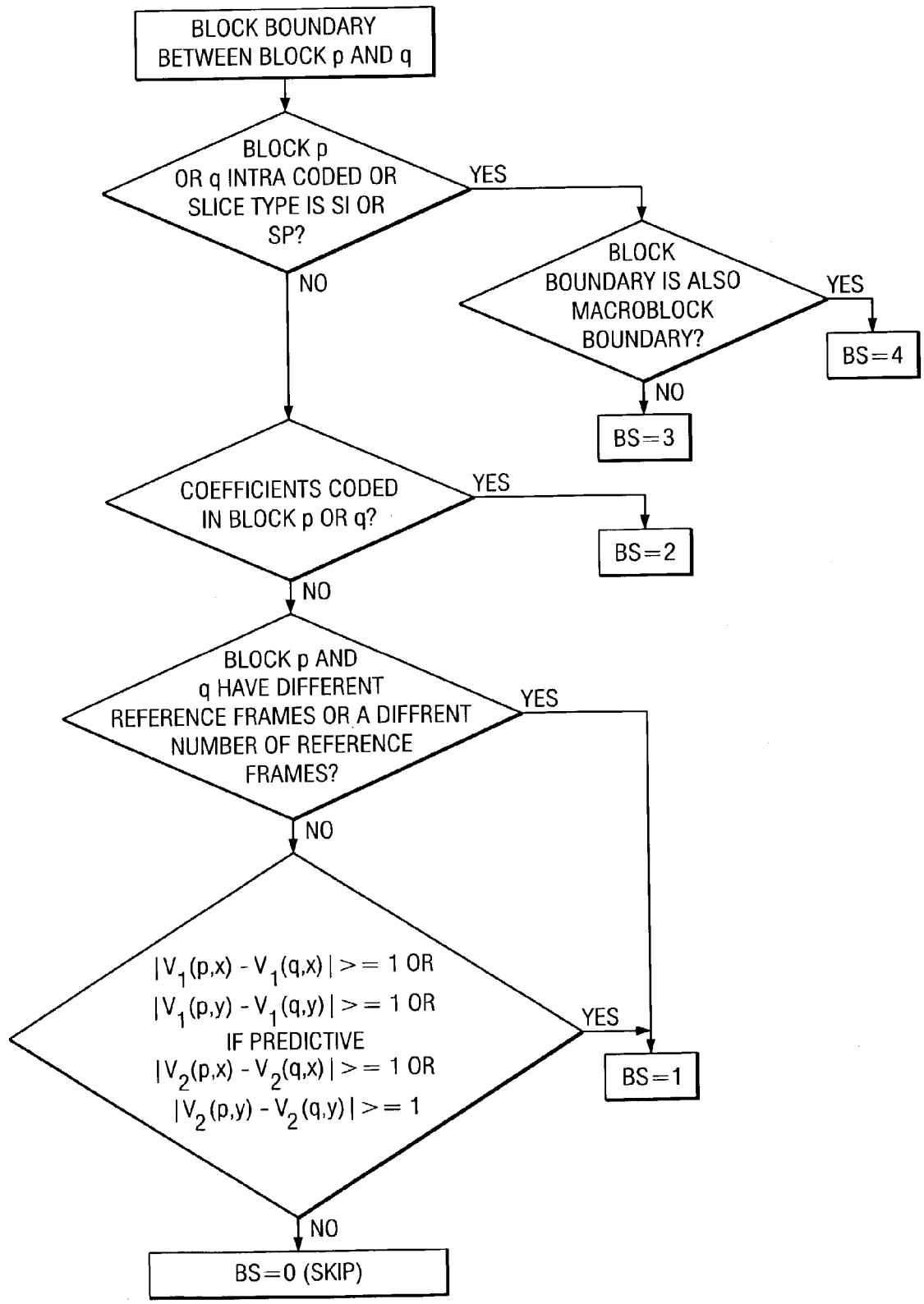
FIG. 4 shows deblocking filter determination.

For each boundary between neighboring 4×4 luma blocks, a "Boundary Strength" Bs is assigned as shown by the process of FIG. 4. If Bs=0, filtering is skipped for that particular edge. In all other cases filtering is dependent on the local sample properties and the value of Bs for this particular boundary segment.

For each edge, if one of the neighboring blocks is intra-coded, a relatively strong filtering (Bs=3) is applied. A special procedure with even stronger filtering might be applied on intra-coded macroblock boundaries (Bs=4). If neither of the blocks are intra-coded and at least one of them contains non-zero coefficients, medium filtering strength (Bs=2) is used. If none of the previous conditions are satisfied, filtering takes place with Bs=1 if at least one of the following conditions is satisfied: (a) prediction of the two blocks is formed using different reference frames or a different number of reference frames. (b) a pair of motion vectors from the two blocks is referencing the same frame and either component of this pair has a difference of more than one sample. Otherwise filtering is skipped for that particular edge (Bs=0).

In the following description, the set of eight samples across a 4×4 block horizontal or vertical boundary is denoted as shown in FIG. 5 with the actual boundary lying between $p_0$ and $q_0$. Uppercase letters indicate filtered samples and lower case letters indicate unfiltered samples with regard to the current edge filtering operation. However, $p_1$ and $p_2$ may indicate samples that have been modified by the filtering of a previous block edge.

Sets of samples across this edge are filtered only if the condition $$Bs \neq 0 \;\&\&\; |p_0-q_0|<\alpha \;\&\&\; |p_1-p_0|<\beta \;\&\&\; |q_1-q_0|<\beta$$

is true. The values of the thresholds $\alpha$ and $\beta$ are dependent on the average value of QP (quantization parameter) for the two blocks as well as on a pair of index offsets "Filter_Offset_A" and "Filter_Offset_B" that may be transmitted in the slice header for the purpose of modifying the characteristics of the filter. The average QP value for the two blocks is computed as $QP_{av}=(QP_p+QP_q)>>1$. The index used to access the $\alpha$-table (FIG. 6a), as well as the C0-table (FIG. 6b) that is used in the default filter mode, is computed as:

$$Index_A=\text{Clip3}(0, 51, QP_{av}+\text{Filter\_Offset\_}A)$$

In SP and SI slices, $QP_{av}$ is calculated in the same way as in other slice types; $QS_Y$ is not used in the deblocking filter.

The index used to access the $\beta$-table (FIG. 6a) is computed as:

$$Index_B=\text{Clip3}(0, 51, QP_{av}+\text{Filter\_Offset\_}B)$$

Two types of filtering are defined for 0<Bs<4. The default case applies the following to filter $p_0$ and $q_0$:

$$\Delta=\text{Clip3}(-C, C, (((q_0-p_0)<<2+(p_1-q_1)+4)>>3))$$

$$P_0=\text{Clip1}(p_0+\Delta)$$

$$Q_0=\text{Clip1}(q_0-\Delta)$$

where C is determined as specified below. Note that the "+4" together with the right shift in the definition of $\Delta$ provides a round-off.

The two intermediate threshold variables $$\alpha_p=|p_2-p_0|$$

$$\alpha_q=|q_2-q_0|$$

shall be used to determine whether filtering for the luma samples $p_1$ and $q_1$ is taking place at this position of the edge.

If $\alpha_p<\beta$ for a luma edge, a filtered sample $P_1$ shall be produced as specified by $$P_1=p_1+\text{Clip3}(-C0, C0, (p_2+(p_0+q_0)>>1-(p_1<<1)>>1)$$

If $\alpha_q<\beta$ for a luma edge, a filtered sample $Q_1$ shall be produced as specified by $$Q_1=q_1+\text{Clip3}(-C0, C0, (q_2+(p_0+q_0)>>1-(q_1<<1)>>1)$$

where C0 is specified in FIG. 6b. Chroma samples $p_1$ and $q_1$ are never filtered. C is determined by setting it equal to C0 and then incrementing it by one if $\alpha_p<\beta$, and again by one if $\alpha_q<\beta$.

When Bs is equal to 4 and the following condition holds:

$$\alpha_p<\beta \;\&\&\; |p_0-q_0|<((\alpha>>2)+2)$$

filtering of the left/upper side of the block edge is specified by the following two filters:

$$P_0=(p_2+2*p_1+2*p_0+2*q_0+q_1+4)>>3$$

$$P_1=(p_2+p_1+p_0+q_0+2)>>2$$

In the case of luma filtering, the following filter is also applied.

$$P_2=(2*p_3+3*p_2+p_1+p_0+q_0+4)>>3$$

Otherwise, if the foregoing condition does not hold but Bs equals 4, the following filter is applied.

$$P_0=(2*p_1+p_0+q_1+2)>>2$$

Similarly, for filtering of the right/lower side of the edge, if the following condition holds:

$$\alpha_q<\beta \;\&\&\; |p_0-q_0|<((\alpha>>2)+2)$$

filtering is defined by the following two filters:

$$Q_0=(p_1+2*p_0+2*q_0+2*q_1+q_2+4)>>3$$

$$Q_1=(p_0+q_0+q_1+q_2+2)>>2$$

In the case of luma filtering, the following filter is also applied.

$$Q_2=(2*q_3+3*q_2+q_1+q_0+p_0+4)>>3$$

Otherwise, if the condition does not hold, the following filter is applied:

$$Q_0=(2*q_1+q_0+p_1+2)>>2$$

The first preferred embodiment methods implement the filterings for the Bs equals 4 case by decomposition of the filters (creating intermediate values) as follows.

Define $$u_0=p_3+p_2$$

$$u_1=p_2+p_1$$

$$u_2=p_1+p_0+2$$

$$u_3=p_0+q_0+2$$

$$u_4=q_0+q_1$$

$$u_5=q_1+q_2$$

$$u_6=q_2+q_3$$

and then define:

$$t_0=u_0+u_1$$

$$t_1=u_1+u_2$$

$$t_2=u_2+u_3$$

$$t_3=u_3+u_4$$

$$t_4=u_4+u_5$$

$$t_5=u_5+u_6$$

Thus the filtering from $p_k$, $q_k$ to $u_k$ is simply a [1,1] filter plus the addition of round-off 2s, and the filtering from the $u_k$ to the $t_k$ is another filtering by [1,1]. Then the Bs=4 deblocking filtering is implemented as:

$$P_0=(t_1+t_3)>>3$$

$$Q_0=(t_2+t_4)>>3$$

$$P_1=(u_1+U_3)>>2$$

$$Q_1=(u_3+u_5)>>2$$

$$P_2=(t_0+u_0+u_3+2)>>3$$

$$Q_2=(t_5+u_6+U_3+2)>>3$$

Note that the direct implementation of the filter to give $P_0$, $Q_0$, is a [1,2,2,2,1]/8 filter, and the first preferred embodiment method effectively decomposes the filter into [1,1]/2* [1,1]/2*[1,0,1]/2. This reduces computational redundancy: the preferred embodiment method requires 19 adds and 4 shifts to compute $P_0$, $Q_0$, $P_1$, $Q_1$, and another 6 adds and 2 shifts to compute $P_2$ and $Q_2$. This compares with a direct implementation of the filterings which requires 18 adds and 10 shifts to compute $P_0$, $Q_0$, $P_1$, $Q_1$, and another 12 adds and 6 shifts to compute $P_2$ and $Q_2$, assuming multiplications are implemented with shifts. As a further comparison, a DSP with a single-cycle MAC (multiply and accumulate) would require 18 MACs and 4 shifts for $P_0$, $Q_0$, $P_1$, $Q_1$, and another 10 MACs and 2 shifts for $P_2$ and $Q_2$.

Futher, the round-off additions may be moved to modify the intermediate values and computations; for example:
Define $$u_0=p_3+p_2$$

$$u_1=p_2+p_1$$

$$u_2=p_1+p_0$$

$$u_3=p_0+q_0+4$$

$$u_4=q_0+q_1$$

$$u_5=q_1+q_2$$

$$u_6=q_2+q_3$$

and then define:

$$t_0=u_0+u_1$$

$$t_1=u_1+u_2$$

$$t_2=u_2+u_3$$

$$t_3=u_3+u_4$$

$$t_4=u_4+u_5$$

$$t_5=u_5+u_6$$

The deblocking filtering is now implemented as:

$$P_0=(t_1+t_3)>>3$$

$$Q_0=(t_2+t_4)>>3$$

$$P_1=(u_1+u_3-2)>>2$$

$$Q_1=(u_3+u_5-2)>>2$$

$$P_2=(t_0+u_0+u_3)>>3$$

$$Q_2=(t_5+u_6+u_3)>>3$$

Similarly, the placement of the round-off addition(s) may be varied in other patterns.

The preferred embodiment filter decomposition similarly applies when either of the conditions $\alpha_p<\beta$ && $|p_0-q_0|< ((\alpha>>2)+2)$ or $a_q<\beta$ && $|p_0-q_0|<((\alpha>>2)+2)$ does not hold but Bs=4 and one or both of the simpler $p_0$ or $q_0$ filters are applied:

$$P_0=(2*p_1+p_0+q_1+2)>>2$$

$$Q_0=(2*q_1+q_0+p_1+2)>>2$$

In particular, the preferred embodiment filter decomposition for this case is:

$$w_0=p_1+q_1+2$$

$$w_p=p_0+p_1$$

$$w_q=q_0+q_1$$

$$P_0=(w_0+w_p)>>2$$

$$Q_0=(w_0+w_q)>>2$$

Thus the total of 6 adds and 2 shifts for the decomposed filter replaces the direct filter 6 adds and 4 shifts (presuming implementation of a multiplication by 2 as a shift) or 6 MACs and 2 shifts. Of course, because $w_p$ and $w_q$ are only used once, they could be replaced by their definitions in $P_0$ and $Q_0$ without changing the number of adds and shifts.

3. Alternative Preferred Embodiments

Further preferred embodiments decompose the Bs=4 filterings in alternative ways in order to remove computational redundancies. For example, define $$w_0=p_0+q_0+2$$

$$w_1=p_1+q_1$$

$$w_{2p}=p_2+p_1$$

$$w_{2q}=q_2+q_1$$

$$w_{3p}=p_3+p_2$$

$$w_{3q}=q_3+q_2$$

and then define:

$$t_0=w_0+w_1$$

$$t_p=w_{2p}+w_0$$

$$t_q=w_{2q}+w_0$$

Thus $$P_0=(t_p+t_0)>>3$$

$$Q_0=(t_q+t_0)>>3$$

$$P_1=t_p>>2$$

$$Q_1=t_q>>2$$

$$P_2=(2*w_{3p}+t_p+2)>>3$$

$$Q_2=(2*W_{3q}+t_q+2)>>3$$

Thus this implementation requires 12 adds and 4 shifts to compute $P_0$, $Q_0$, $P_1$, $Q_1$, and another 4 adds and 4 shifts to compute $P_2$ and $Q_2$, assuming the multiplications by 2 are implemented with shifts.

Again, the round-off additions can be reallocated, such as by the "+2" in $P_2$ could become a "+1" in the definition of $w_{3p}$, and so forth.

4. Modifications

The preferred embodiment methods may be modified in many ways while retaining the feature of decomposition of deblocking filters.

For example, if the $P_k$ and $Q_k$ filters differ, then only the necessary portion of the decomposition intermediate values are computed.

What is claimed is:

1. A method of deblocking filtering, comprising:
   (a) providing adjacent first and second macroblocks in an image;
   (b) finding deblocking filters for said macroblocks;
   (c) decomposing ones of said deblocking filters which combine 8 pixel values (counting repeats) into three stages with a first stage combining pairs of said pixel values to yield first-stage intermediate values, a second stage combining pairs of said first-stage intermediate values to yield second-stage intermediate values, and a third stage combining values from the group consisting of said pixel values, said first-stage intermediate values, and said second-stage intermediate values; and
   (d) applying said deblocking filters including any decomposition from step (c) to said macroblocks.

2. The method of claim 1, wherein:
   (a) ones of said deblocking filters which combine 4 pixel values (counting repeats) combine values from the group consisting of said first-stage intermediate values.

3. The method of claim 1, wherein:
   (a) ones of said deblocking filters which combine 4 pixel values (counting repeats) use values from the group consisting of said second-stage intermediate values.

4. The method of claim 1, wherein:
   (a) said combining of pairs of pixel values of step (c) is selected from the group of operations consisting of (i) addition of a pair of pixel values and (ii) addition of a pair of pixel values plus addition of a round-off term.

* * * * *